(12) United States Patent
Hombu

(10) Patent No.: US 9,032,842 B2
(45) Date of Patent: *May 19, 2015

(54) WIRE STRIPPER

(75) Inventor: Kosuke Hombu, Tokyo (JP)

(73) Assignee: Komax Holding AG, Dierikon (CH)

( * ) Notice: Subject to any disclaimer, the term of this patent is extended or adjusted under 35 U.S.C. 154(b) by 202 days.

This patent is subject to a terminal disclaimer.

(21) Appl. No.: 13/813,024

(22) PCT Filed: Jul. 27, 2011

(86) PCT No.: PCT/JP2011/067716
§ 371 (c)(1),
(2), (4) Date: Jan. 29, 2013

(87) PCT Pub. No.: WO2012/015062
PCT Pub. Date: Feb. 2, 2012

(65) Prior Publication Data
US 2013/0125710 A1      May 23, 2013

(30) Foreign Application Priority Data

Jul. 29, 2010 (JP) .................. 2010-169987
Jun. 29, 2011 (JP) .................. 2011-143705

(51) Int. Cl.
*H02G 1/12* (2006.01)
*H01R 43/28* (2006.01)

(52) U.S. Cl.
CPC ............. *H02G 1/1253* (2013.01); *H01R 43/28* (2013.01); *H02G 1/1256* (2013.01)

(58) Field of Classification Search
CPC ..... H01R 43/28; H02G 1/1253; H02G 1/1256
USPC .................. 81/9.4, 9.41–9.44, 9.51
See application file for complete search history.

(56) References Cited

U.S. PATENT DOCUMENTS 8,739,657 B2 * 6/2014 Nakamura ................. 81/9.4

FOREIGN PATENT DOCUMENTS

JP          7227022 A      8/1995
JP         10112913 A      4/1998

* cited by examiner

*Primary Examiner* — David B Thomas
(74) *Attorney, Agent, or Firm* — Fraser Clemens Martin & Miller LLC; William J. Clemens

(57) ABSTRACT

A device for stripping coating from electric wires is provided with a function to detect any contact between a wire core and stripping blades even for electric wires which have been cut short. This device has a signal analyzer circuit for measurement of impedance via stripping blades capable of detecting any contact between the stripping blades and the wire core by detecting a change in impedance as a result of addition of impedance of the wire core to that of the stripping blades at the moment of any contact of the stripping blades with the core of the electric wire in the course of stripping coating from the electric wire.

9 Claims, 9 Drawing Sheets

Operation Flow Chart

Mortor Operation and Contact Determination Flow

WIRE STRIPPER

FIELD

When a device for stripping coating away from electric wire (in the following referred to as "wire stripper", as the case may be) is concerned which is so designed that the stripping blades are fed into the coating of electric wire and put into a relative movement against the said electric wire so as to strip (strip away) a part of the said coating, the wire core may sometimes be subject to be scratched or be damaged if the stripping blade comes in contact with the wire core in the course of stripping the wire coating (in the following referred to as "stripping", as the case may be).

This invention relates to the said wire stripper, which is, however, provided with a function to detect any contact between the wire core and the blade even if those wires which have been cut short are concerned.

BACKGROUND

While wire strippers of various types have become common heretofore, a part of the wire coating is cut and stripped away by use of a cutter in most cases.

When stripping the coating, it is necessary to feed the blade into the wire coating as deeply as possible in order to cut the wire coating more precisely and sharply. The wire core may, however, be subject to be scratched or a part of it may be cut off if the blade comes in contact with the wire core to result in rejection of the electric wire concerned.

Since absolute safety is demanded especially for the electric wire for automotive or aircraft industries, even an electric wire having the slightest scratches on its core is rejected for the reason that it may be damaged and lead to serious accidents if used for movable parts or in any position subject to vibrations because of stress concentration on the scratches.

A function to detect any contact between the wire core and the stripping blade is, therefore, deemed as indispensable for the wire stripper so that a number of automatic wire strippers developed in recent years are provided with the said function of contact detection. Most of them, however, use a method to detect any contact between the wire core and the blade through detection of electric conduction between electrodes which are allocated to them, respectively.

As an example, a wire stripper according to the patent document (Japanese Patent Opening No. 87643/1995) referred to later is described in the following while taking FIG. 9 as the basis.

According to this heretofore known technique, an electric wire 63 is led through a wire guide 84 and fastened by a wire gripper 85. A cassette blade 86 is then put into operation to make an incision on an insulating coating 71 of a core 70 of the electric wire 63 by means of incision making cutters 87 and to cut the electric wire 63 by means of cutting blades 82 so as to strip the coating by simultaneously pulling it axially by means of a wire gripper 85.

When the incision making cutters 87 in the cassette blade 86 come now in contact with the wire core 70 in the phase of incision to the coating 71, an alternating current flows through it by way of a capacitance arising between the electric wire 63 and the wire gripper 85, a detector 88 and an AC power supply 89 in the said order. A voltage corresponding to this current is detected by the detector 88 to confirm the contact of the incision making cutter 87 with the wire core 70.

SUMMARY

It is extremely difficult for the method of detecting core scratches according to the patent document discussed above as shown in FIG. 9 to ensure a point to attach a corresponding mechanism if the electric wire to be finished is of short length. The said detection method is inappropriate also from the safety point of view in case of manual stripping operation by use of a desktop wire stripper.

This invention is namely featured by making it possible for a wire stripper to detect any change in impedance due to addition of the below-described impedance of a wire core at the moment when stripping blades have come in contact with the wire core through connection between the stripping blades serving as a contact sensor (so-called electrode) and a signal analyzer circuit by means of a conductor so as to detect any contact between the stripping blades and the wire core.

The present invention aims at detection of core scratches with a high degree of accuracy under the identical conditions for every wire regardless of how short it has been cut or if it is long by detecting the impedance (incl. resistance, inductance and capacitance) of the wire core by means of a wire stripper which makes use of the stripping blades 27, 27 as the contact sensor (see FIG. 5).

It further aims to allow for an alternative determination to deem a wire product as non-rejectable according to the extent or portion of contact even if the stripping blades have come in contact with its core by provision with a function to enable optional setting of positional and temporal elements of contact for detecting any contact between the said stripping blades and the wire core and thus to manage such temporal elements right from the beginning till completion of the said stripping operation in order to prevent unnecessary operation discontinuation in case of employment of the said function for an automatic wire stripper, etc.

Furthermore, it is featured by the fact that only the stripping blades serve as the electrodes for contact detection to simplify the structure (or constitution) of the wire stripper.

DETAILED DESCRIPTION

Figure 1:
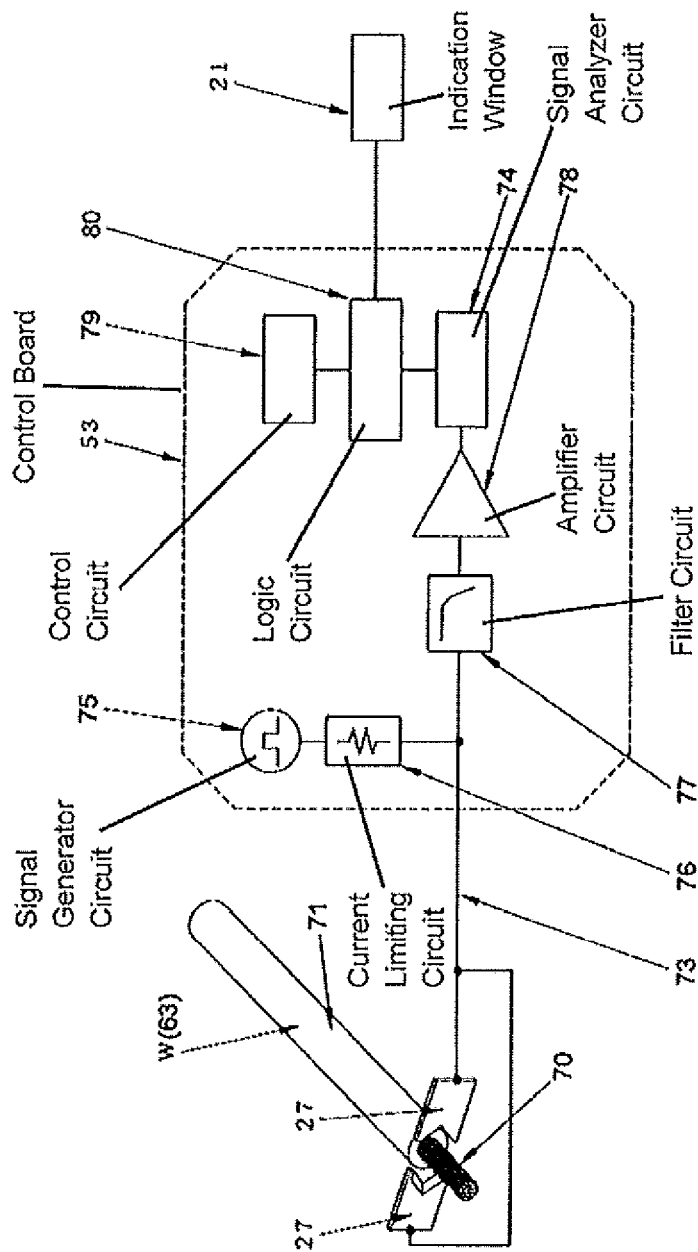
FIG. 1 is a schematic view of the mechanism for detecting a contact between the wire core and the stripping blades for a wire stripper as an embodiment of the invention.

Some of the reference numerals shown in the drawings represent the following: positioning rod 5; gripper 25; blade holder 26; stripping blade 27; sensor rod 45; stopper 46; sensor 47; control board 53; electric wire 63 (W); core 70;

coating 71; conductor 73; signal analyzer circuit 74; electric signal generation circuit 75; current-limiting circuit 76; filter circuit 77; amplifier circuit 78; control circuit 79; and logic circuit for determination 80.

A desktop wire stripper as an embodiment of the invention is described below in detail while referring to FIGS. 3, 4 and 5. The electric wire may in the following description be referred to simply as wire, as the case may be.

Figure 3:
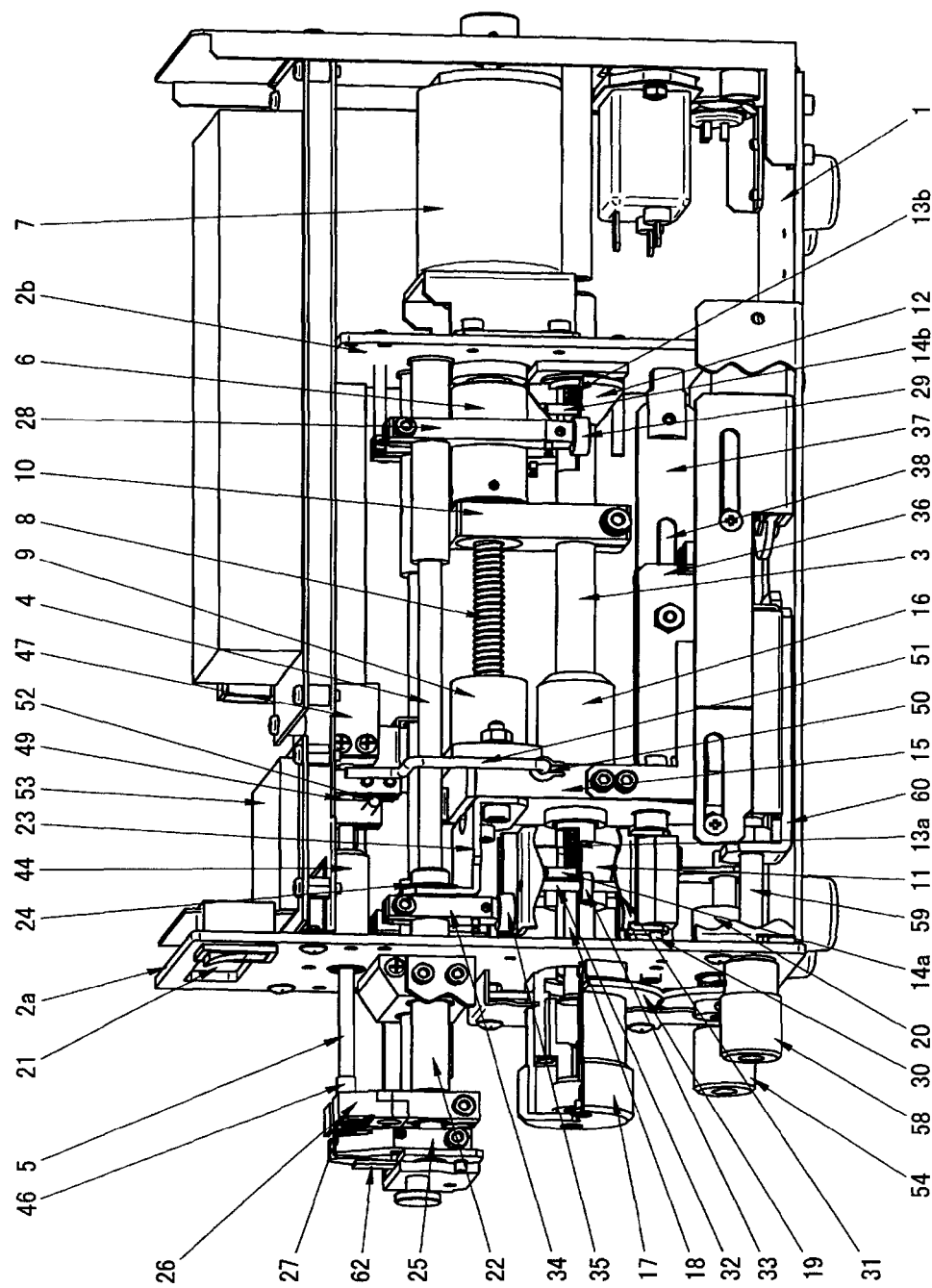
FIG. 3 is a view of internal structure of a desktop wire stripper as above.

First, the internal structure of the wire stripper according to this embodiment is described on the basis of FIG. 3. This device is of constitution equivalent to that of the wire stripper according to Japanese Patent No. 3501596, supplemented with an additional mechanism or function for detection of any contact between the wire core and the stripping blades. In the following description, the left side of the drawing corresponding to the wire insertion side is referred to as "front portion", while the right side is referred to as "rear portion".

A main spindle 3 is here borne in a rotatable and axially slidable manner in the section from the front end of machine frame 1 to the lower portion between intermediate side walls 2a and 2b while two auxiliary shafts 4, 4 which are parallel to each other are borne also in a freely rotatable manner between the side walls 2a and 2b directly above the main spindle 3. In addition, a positioning rod 5 is provided above the center between these auxiliary shafts 4, 4 to determine the position for wire end insertion and to obtain the starting signal.

A shaft is provided directly above and parallel to the main spindle 3 while the rear end of the main spindle 3 is formed as a spline shaft 6 on which the rotating shaft of an electric motor 7 located in the rear portion of the side wall 2b is fitted in a slidable manner so that rotation of the motor 7 is transmitted via the spline shaft 6 to a ball screw shaft 8 coaxial with the spline shaft 6. A ball nut member 9 is allowed to freely move forward and backward by rotational motion of the ball screw shaft 8. The lower portion of an arm 10 fitted between the spline shaft 6 and the ball screw shaft 8 in a freely rotatable manner grasps the main spindle 3 and causes it axially to slide so that an identical position with that of the ball screw shaft 8 may be kept.

On the main spindle 3, a first conical cam 11 and a second conical cam 12 tapering off to the front side, respectively, are fitted in a coaxially slidable manner, while compression springs 13a, 13b in the form of a coil are inserted to them, respectively, to forward press the first conical cam 11 and the second conical cam 12, respectively, with a prescribed force via pins 14a, 14b. The main spindle 3 is inserted in a bushing 16 in a slidable manner, which is fixed to a move board 15 to which in turn the ball nut member 9 is fixed.

At the front end of the main spindle 3 protruding from the side wall 2a of the machine frame 1, an incision adjusting knob 17 is provided for adjusting the incision to the wire coating in such manner that a positioning member 18 is allowed to move forward and backward by screw-through rotation of the adjusting knob 17. The positioning member 18 is so constituted to freely strike on the pin 14a of the first conical cam 11 that advance of the first conical cam 11 can be stopped. In addition, the corresponding incision diameter is indicated on an indication window 21 on the upper front part of the device in conjunction with rotation of the adjusting knob 17.

Pipe-like tube shafts 22, 22 are fitted externally to the front end of the auxiliary shafts 4, 4 in a slidable manner while the rear end of these tube shafts 22, 22 is inserted into and borne by a bearing 24 of arm 23 which is Z-formed laterally and fixed to the move board 15. The base of grippers 25, 25 is fixed to the front end of the auxiliary shafts 4, 4 protruding from the tube shafts 22, 22, while the base of blade holders 26, 26 located behind the grippers 25, 25 is fixed to the front end of the tube shafts 22, 22. The stripping blades 27, 27 having a V-shaped edge are fixed to the front faces positioned oppositely to each other in the blade holders 26, 26 as shown in FIG. 5.

Since the ball nut member 9 is fixed in position as shown in FIG. 3 at the beginning of forward rotation of the motor 7, the main spindle 3 advances along with advance of the ball screw shaft 8 as it is screwed with the balls in the ball nut member 9 by its forward rotation. Then, the conical cam 11 first pushes away the cam rollers 33, 33 to both sides to set the upper ends of oscillating members 31, 31 apart from each other while oscillating them so that the oscillating members 31, 31 push rollers 35, 35 on arms 34, 34 to rotate the tube shafts 22, 22, respectively, which form an entirety with the said rollers, and to close the blade holders 26, 26 at the front end of the said tube shafts. As a result of this, the stripping blades 27, 27 in the blade holders 26, 26 are fed into the coating 71 of wire W to a prescribed depth and clamp them as shown in FIG. 5(B).

Arms 28, 28 are fixed at the upper end to near the rear end of the auxiliary shafts 4, 4 and runs vertically down from there. Cam rollers 29, 29, which are attached to the lower end of these arms 28, 28 in a manner freely rotatable within a horizontal plane, strike on the peripheral face of the second conical cam 12 and are pushed by this peripheral face along with advance of the second conical cam 12 to rotate the auxiliary shafts 4, 4 in opposite directions to each other so that the grippers 25, 25 close along with advance of the second conical cam 12 and open along with its retraction.

The oscillating members 31, 31 are attached to both sides of the first conical cam 11 while being supported at the lower end by the side wall 2a to be capable of freely pivoting on shafts 30, 30 and cam roller 33 on a vertical shaft 32 of the oscillating member 31 abuts against the peripheral face of the first conical cam 11. Rollers 35, 35 abut against the outer side of the upper end of this oscillating member 31, while being supported at the lower end of the arms 34, 34 fixed to the tube shafts 22, 22 in a manner freely rotatable within a horizontal plane. According to advance and retraction of the first conical cam 11, the tube shafts 22, 22 rotate in opposite directions to each other via the arms 34, 34 so that the blade holders 26, 26 close along with advance of the first conical cam 11 and open with its retraction.

A brake unit 36 is interposed between the move board 15 and the side wall 2b on the rear portion of the machine frame 1. This brake unit 36 serves for ensuring a resistance to the ball nut member 9 during its backward movement and is so constituted that a plate 40 on the move board 15 side is connected via a penetrating shaft 39 to a horizontal slot 38 formed on the base 37 fixed to the side wall 2b and that a frictional braking action by spring force of a spring 41 upon a shoe 42 is given to the base 37 so as to convert the resistance of the ball nut member 9 when it returns into the gripping force of the grippers 25, 25 and the incision force of the stripping blades 27, 27, respectively.

When the timing of movement of the first conical cam 11 and the second conical cam 12 is concerned, the main spindle 3 advances by the ball screw shaft 8 while the ball nut member 9 remains fixed to close the blade holders 26, 26 by the first conical cam 11 and then to close the grippers 25, 25 along with advance of the second conical cam 12. If the second conical cam 12 stops advancing, the ball nut member 9 retracts by then arising reactive force against the load of the brake unit 36, whose resistance in turn acts on the grippers 25, 25 to close and grip the wire 63, while the coating is pulled (stripped) away from the wire core as the blade holders 26, 26 retract along with retraction of the ball nut member 9.

Figure 4:
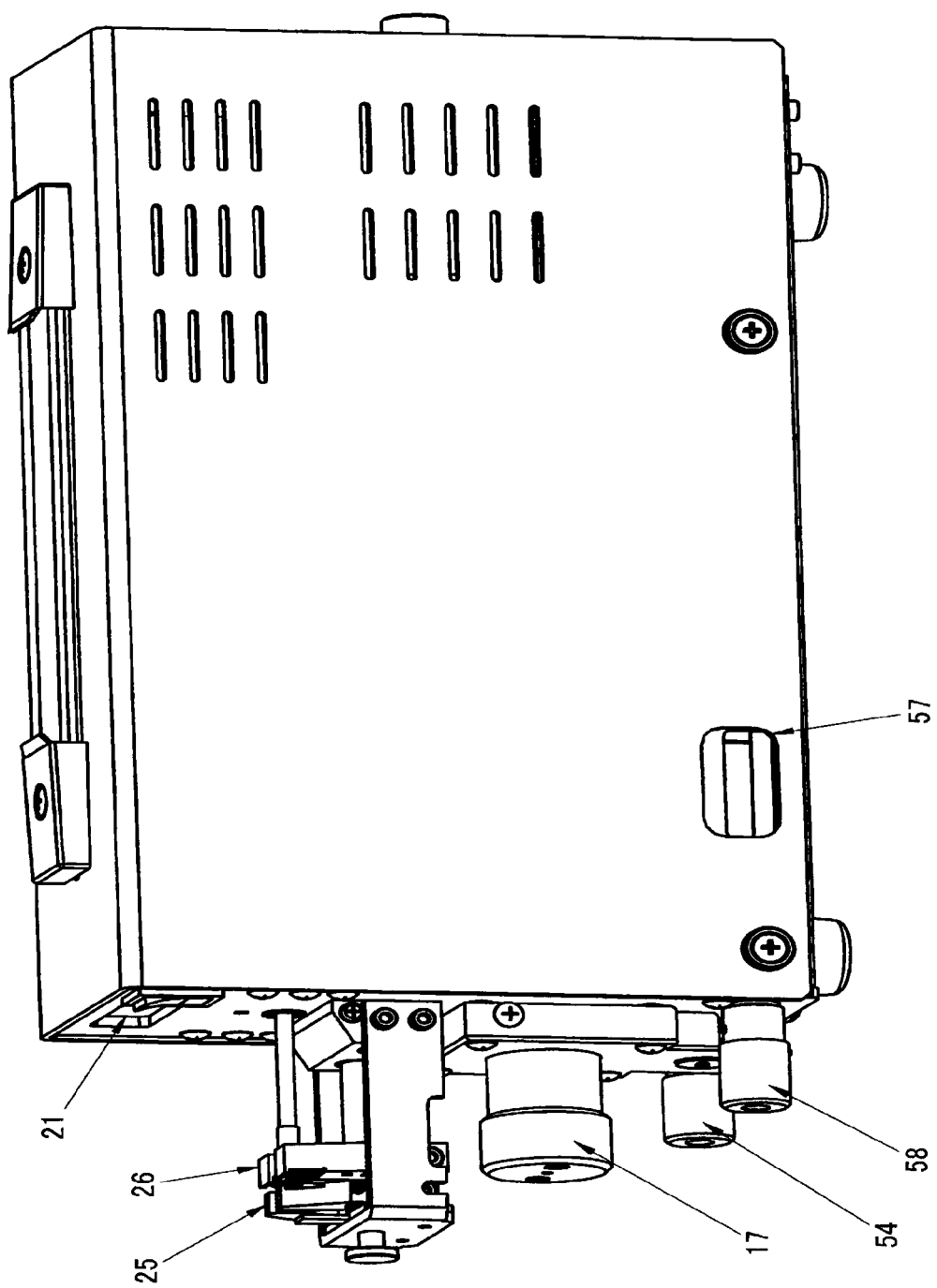
FIG. 4 is an external view of a desktop wire stripper as above.
Figure 5:
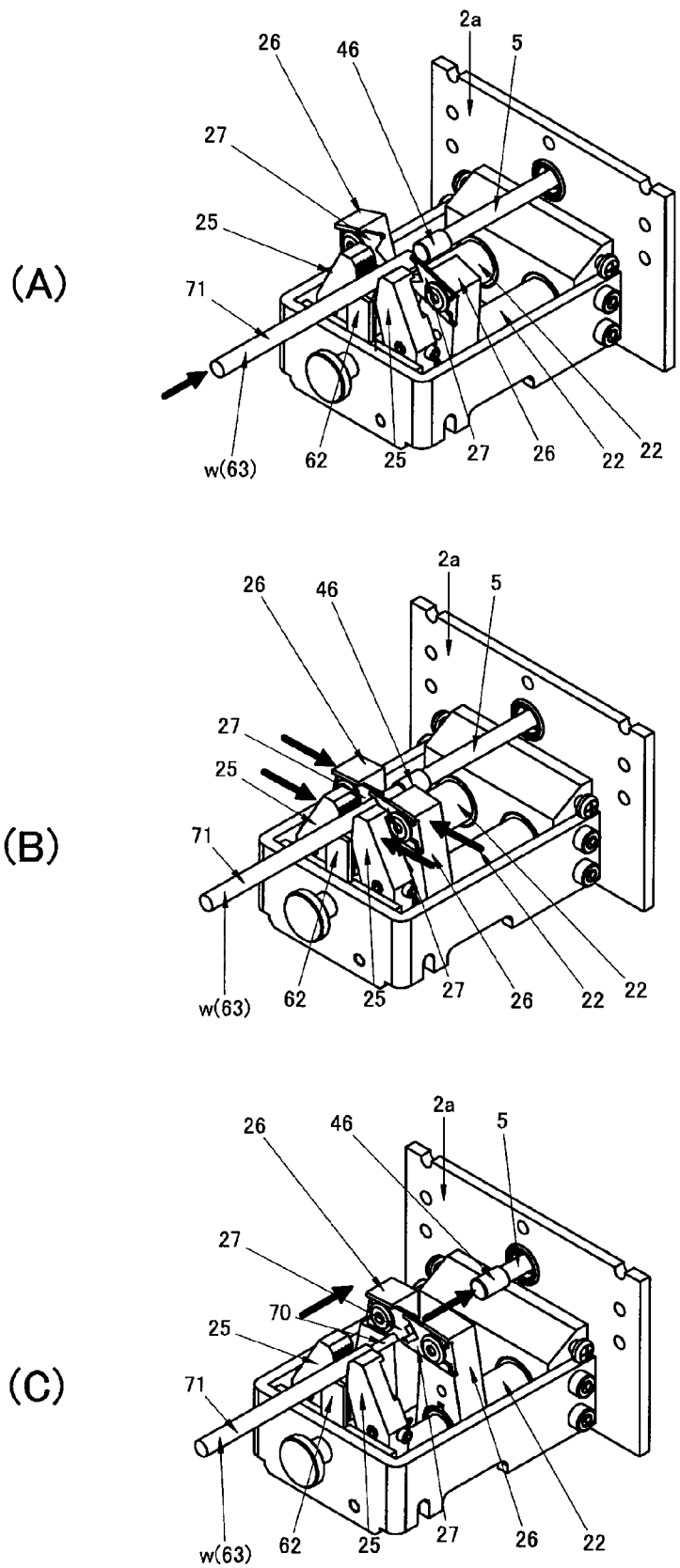
FIG. 5 is a perspective view of a desktop wire stripper as above in stripping operation showing the state in which (A) electric wire is inserted into the gripper, (B) electric wire is gripped by the gripper and the stripping blades are fed into the wire coating and (C) the coating has been stripped.

As shown in FIG. 4, it is also possible by turning a knob 58 for adjusting the lead length of coating to adjust the position of a sensor 61 issuing motor reversing command, which is located on a bracket 60 screwed with a screw shaft 59 of the lead length adjusting knob 58, so as to adjust the lead length of coating. It is further enabled to indicate in the display window 57 a corresponding lead length of coating converted from the position of the sensor 61 for issuing motor reversing command. Incidentally, numeral 62 in FIG. 5 stands for a supporting member for wire insertion.

By varying the position of a positioning member 56 by turning a knob 54, an outer tube 43 is, therefore, positioned by tension spring (not shown in the drawings) via a lever 51, a stopper 46 of a sensor rod 45 is positioned and the insertion depth (or point) of the wire end is set so as to choose the stripping length of coating. A turning of the knob 54 leads to indication of a stripping length of coating in the graduated indication window 57 formed on the side of the device, converted from the position of the positioning member 56 (see FIG. 4).

The blade holders 26, 26 are of vertically dual-partitioning structure where the upper portion fixing the stripping blades 27, 27 is made of an insulating material and the lower portion is composed of a metal so that the stripping blades 27, 27 are electrically isolated from the device.

In the said device according to the invention, any contact of the stripping blade 27 with the core 70 of wire W (63) is detected as follows in the course of stripping a part of the coating 71 of wire (63):

The stripping blades 27, 27 are connected to a control board 53 by means of a conductor 73 for impedance detection as shown in FIG. 1 so that impedance e.g. capacitance (the same applies to the following) can be measured through the stripping blades 27, 27 serving as electrodes. Furthermore, electric signal e.g. rectangular wave signal generated in an electric signal generation circuit 75 is transmitted via a current-limiting circuit 76 to the stripping blades 27, 27 in the circuit for detecting any contact with the core 70 of electric wire (63).

The electric signal given to the stripping blades 27, 27 is led through a filter circuit 77 for removing noise, etc. and transmitted to a signal analyzer circuit 74 via a signal amplifier circuit 78 for monitoring any minute change at the moment of contact of the stripping blades 27, 27 with the wire core 70. A logic circuit 80 for determination finally determines whether there has been any harmful contact between the stripping blades 27, 27 and the wire core 70 on the basis of the signal received by the signal analyzer circuit 74 and the preset determination time for wire coating stripping operation obtained from a control circuit 79. If determined that there has been any harmful contact, an error (Err) will be indicated in the indication window 21 with an indicator.

The said electric signal can be sampled in cycles e.g. on the microsecond time scale. If the stripping blades 27 have come in contact with the core 70 of electric wire W (63), a pulse output is generated depending on the blade position in operation to strip the coating 71 and is detected by the signal analyzer circuit 74 as a change in impedance due to addition of the impedance of the wire core 70 (see FIGS. 1 and 2).

The coating stripping operation including the said detecting operation is described next on the basis of the explanatory view of operation of the desktop wire stripper.

First, the incision adjusting knob 17 is turned to set the value indicated in the indication window 21 so as to obtain an incision depth corresponding to the diameter of electric wire to be finished. In parallel herewith, the stopper positioning knob 54 is turned to set the coating stripping length and the lead length adjusting knob 58 is turned to set the lead length to desired values, respectively, while observing the indication window 57. The volume (thickness) of the coating to be torn off can be reduced at this moment to ensure a smooth and stable stripping operation by increasing the incision depth as far as possible.

As shown schematically in FIG. 5(A), the tip of wire W (63) is inserted between the grippers 25, 26 and strikes against the stopper 46 at the front end of the sensor rod 45 to push it slightly backward so that the sensor rod 45 retracts against a weak force of spring 48 and blocks a sensor 47 with its rear end. When the sensor 47 detects a retraction of the sensor rod 45, it releases a detection signal to start the motor 7 in forward direction to advance the main shaft 3.

At the same time when the impedance immediately before the beginning of stripping operation is stored on the basis of the signal detected by the sensor 47, the said determination regarding contact detection is started. It is then continued during one process until the motor stops to determine whether the stripping blade 27 has come in contact with the core 70 of electric wire W (63).

Figure 2:
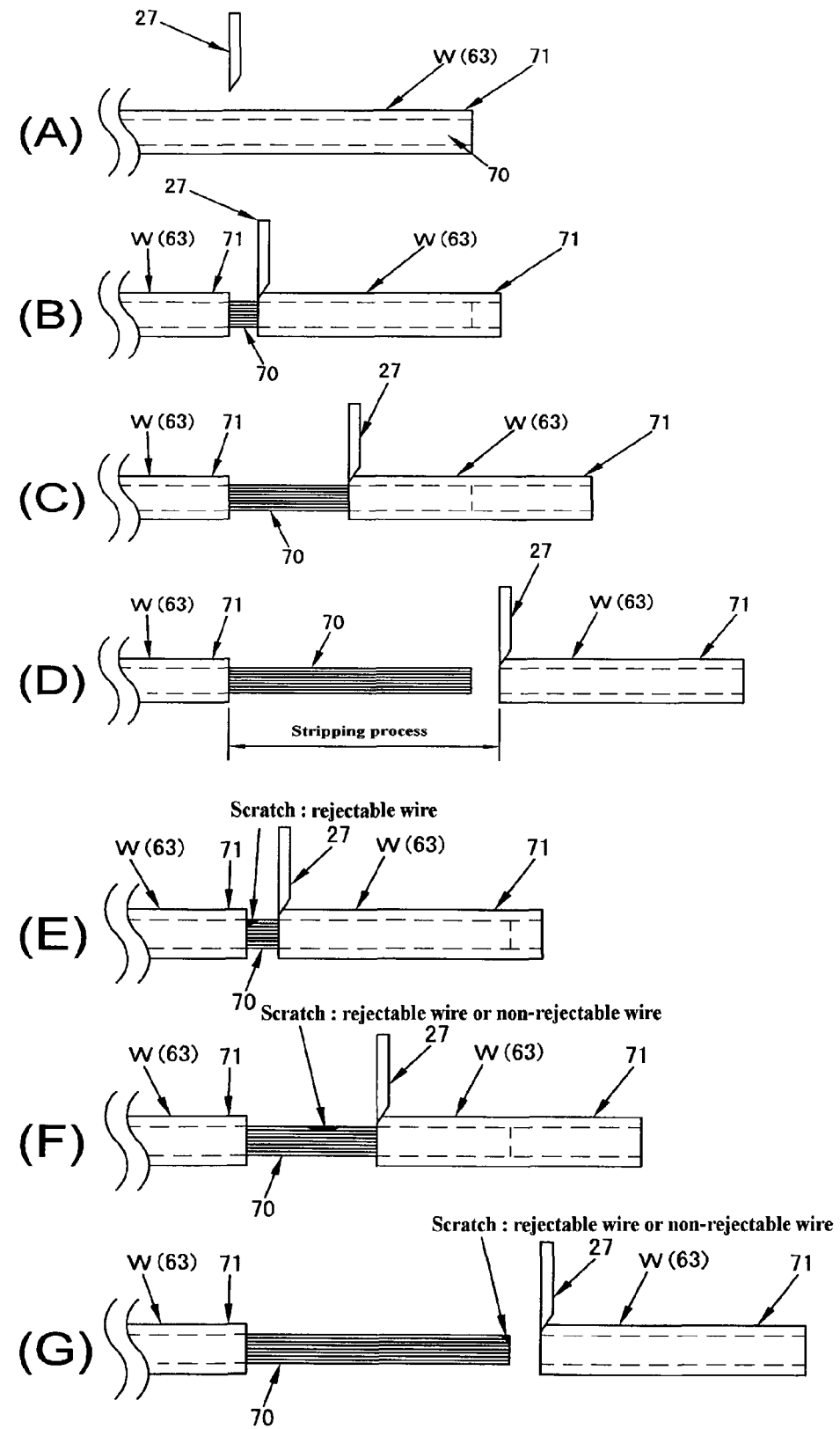
FIG. 2 is a side view showing the state of setting of objective time span in stripping process for a wire stripper as above.

It can be set to determine on one hand a wire product as rejectable (no good) when there has been any core contact, even if so slight as shown in FIG. 2(E), as far as the time span from FIG. 2(A) to FIG. 2(B), namely the early stage of stripping process after starting incision is concerned, but to determine on other hand a wire product also as non-rejectable which has suffered from a core contact as shown in FIG. 2(F) in the further processes. It can freely be set also by use of the temporal management function not to detect any contact between the stripping blades and the wire core immediately before termination of the stripping process, as far as the time span from FIG. 2 (C) to FIG. 2 (D).

It is accordingly also possible owing to the temporal management function to exclude from the objectives of determination in case of a minute contact scratch on the tip arising immediately before stripping termination as illustrated in FIG. 2(G).

Figure 7:
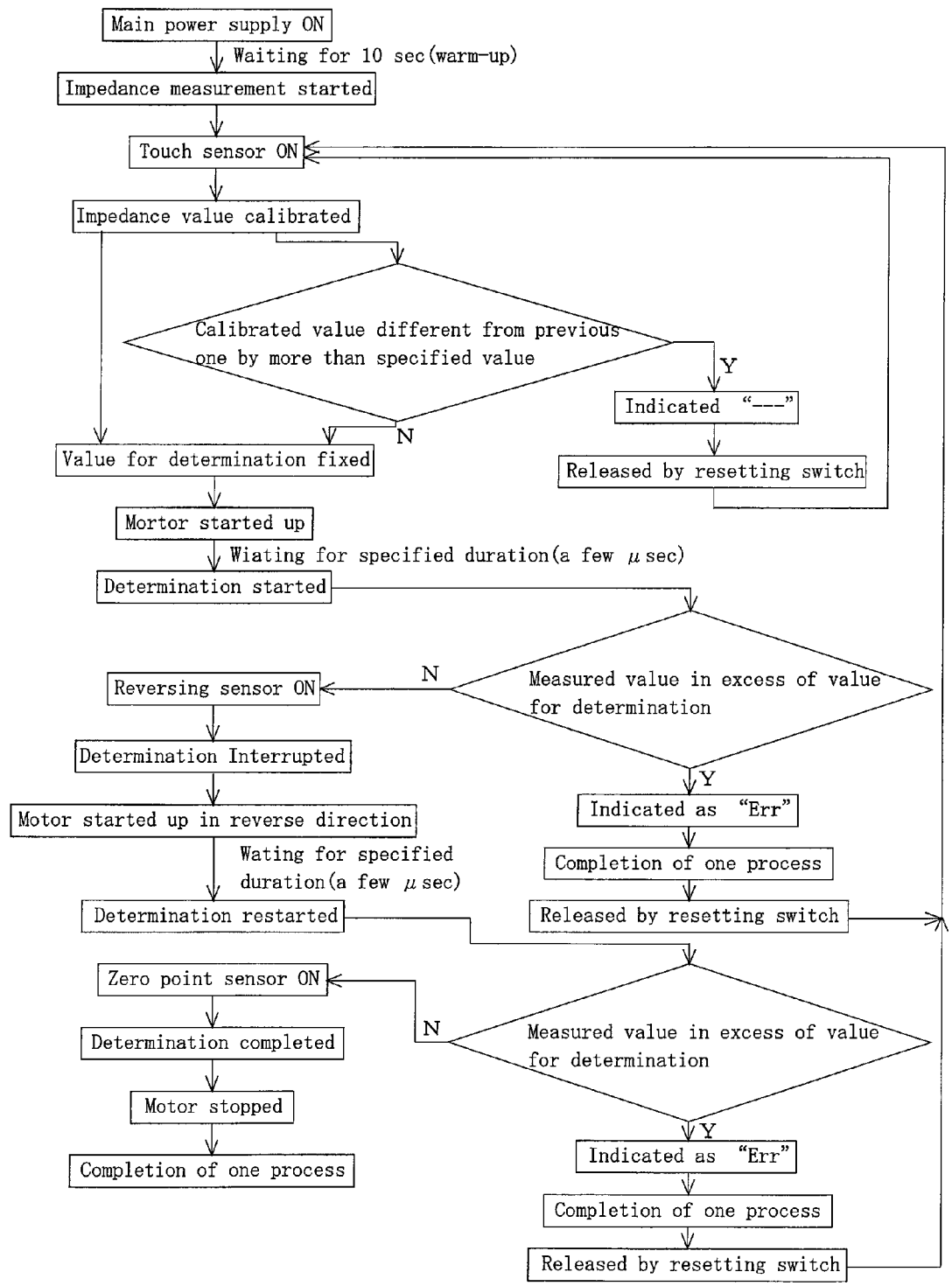
FIG. 7 is a flow chart of motor operation and determination of contact for a desktop wire stripper as above.

It becomes further possible not to make determination regarding contact detection for a certain time span immediately after output of a signal for starting up, reversing and stopping the motor to prevent influences of spike noise from it at start-up, etc. in order to raise the accuracy of contact detection (see FIG. 7).

Owing to the said temporal management function, duration of contact between the wire core and the stripping blades is available as another criterion for determination. That is to say, a long-duration contact may cause a long and deep scratch, while a contact of an extremely short duration may not cause any scratch depending on the extent of contact. It is, therefore, possible when deeming the duration as a determination criterion to distinguish between an extremely short contact without affecting the wire quality and a long-duration contact by sampling the duration of contact between the wire core and the stripping blades on the microsecond time scale. The elementary equipment for the said temporal management function may be replaced with a positional information equipment such as encoder and magnet scale.

The ball nut member 9 is fixed in position as shown in FIG. 3 at the beginning of forward rotation of the motor 7 so that the main spindle 3 advances along with advance of the ball screw shaft 8 which is, by its forward rotation, screwed with the balls in the ball nut member 9. The main spindle 3 hereby pushes first the cam rollers 33, 33 in the first conical cam 11 to both sides so that the oscillating members 31, 31 oscillate to apart from each other at the upper end and push the rollers 35, 35 on the arms 34, 34 to rotate the tube shafts 22, 22 integrated with them, respectively, so as to close the blade holders 26, 26 located at the front end of the tube shafts. The stripping blades 27, 27 in the blade holders 26, 26 are then fed into the coating 71 of wire W to a prescribed depth and clamp it as shown in FIG. 5(B).

On the other hand, the advancing main spindle 3 pushes in both directions the cam rollers 29, 29 on the arms 28, 28 of the auxiliary shafts 4, 4 in the second conical cam 12 to rotate the auxiliary shafts 4, 4 in opposite directions to each other so that the grippers 25, 25 close to grip the wire W.

When this state has been reached, the main spindle 3 stops advancing as the front end of the positioning member 18 strikes against the pin 14*a* of the first conical cam 11 of the main spindle 3 so that the ball nut member 9 begins to retract by rotation of the ball screw shaft 8. Retraction of the ball nut member 9 results in retraction of the bearing 50 of the lever 51 so that the positioning rod 5 being energized by the tension spring retracts while pushing the upper end of the lever 51 and that the tube shafts 22, 22 retract which are connected to the auxiliary shafts 4, 4 via the arm 23. The coating 71 having been cut at the wire end by the stripping blades 27, 27 is hereby pulled away from the wire core 70 as shown in FIG. 5(C).

Figure 6:
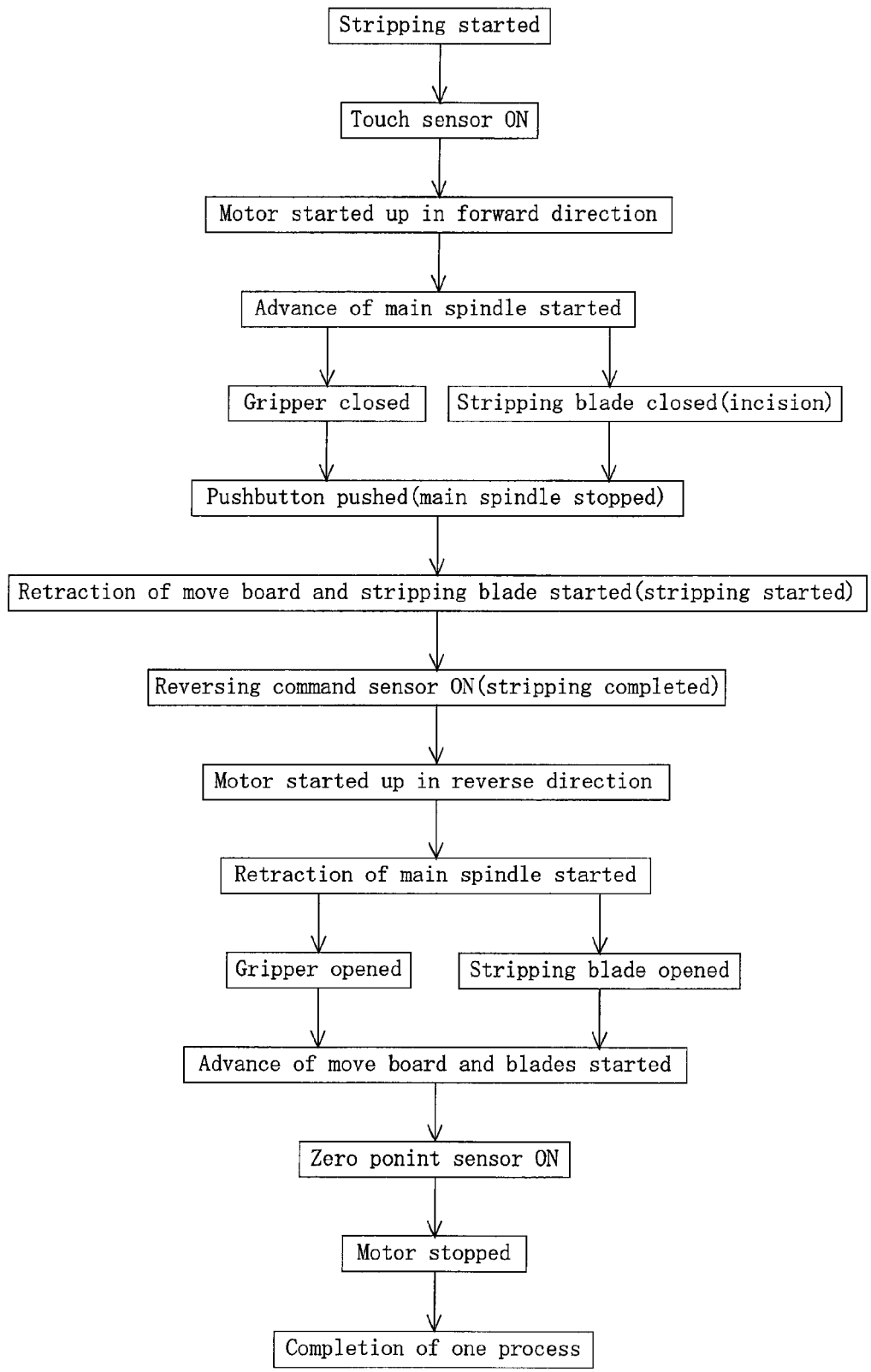
FIG. 6 is a flow chart of mechanical operation of a desktop wire stripper as above.

A flow of the said stripping operation is summarized in FIG. 6 and that of the said contact determination inch motor operation is shown as a whole in FIG. 7.

Figure 8:
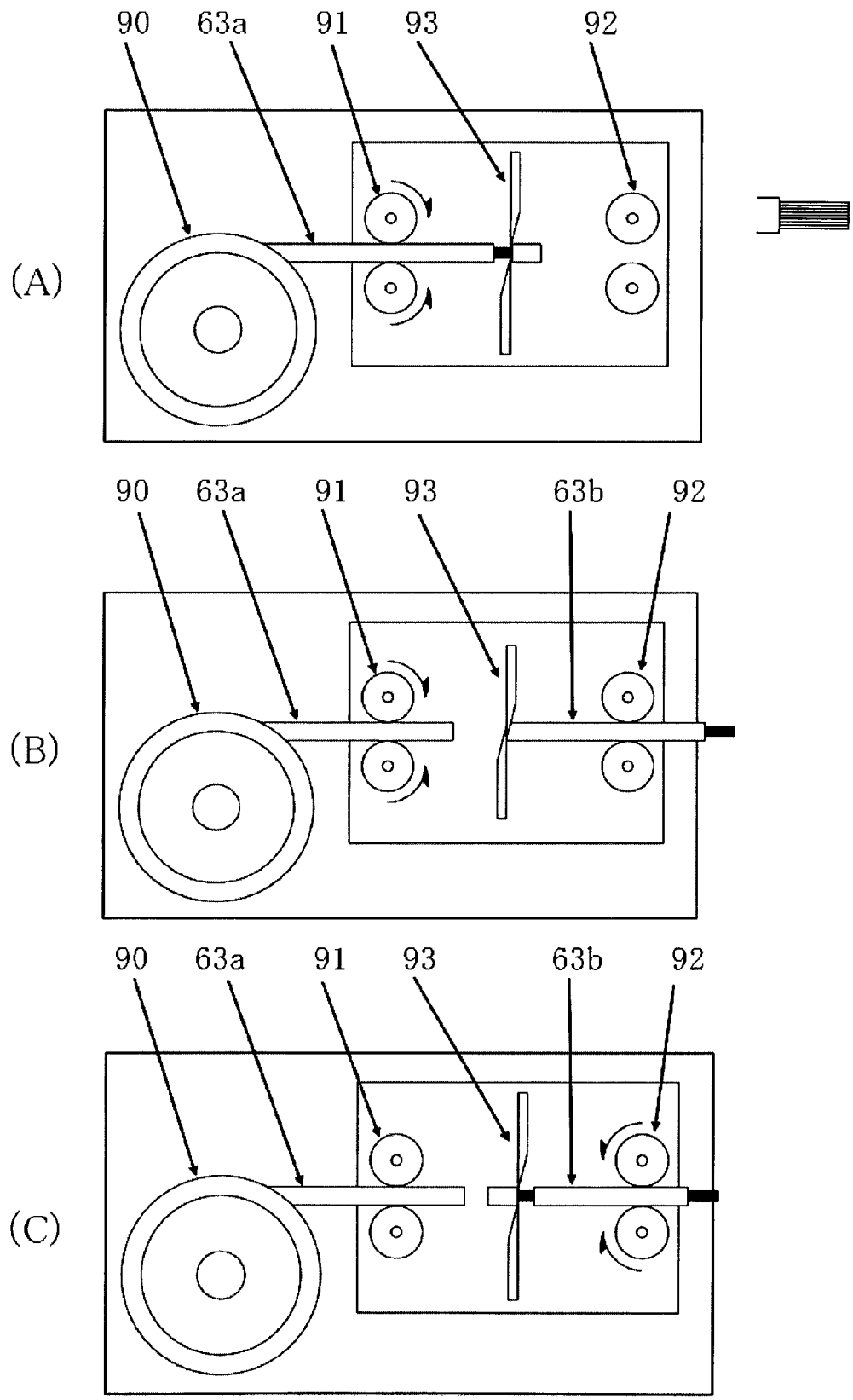
FIG. 8 is an explanatory view of automatic wire stripper as another embodiment of the invention.
Figure 9:
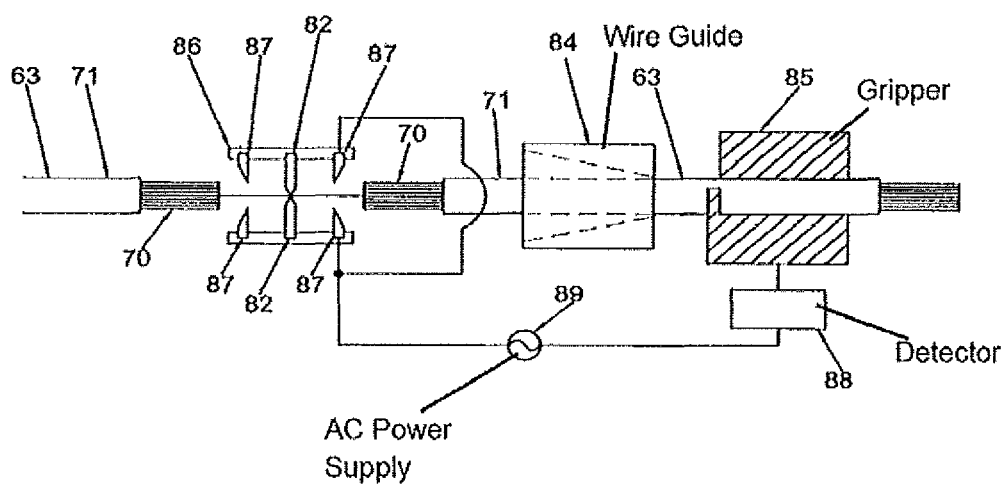
FIG. 9 is an explanatory view of a wire stripper according to the previously discussed patent document (Japanese Patent Opening No. 87643 1995).

FIG. 8 is an explanatory view of operation of an automatic wire stripper commonly in use (in the following referred to as "automatic stripper",) to which this invention can be applied. This automatic wire stripper is furnished with a length-measuring and cutting function to cut the electric wire into constant lengths in addition to a function to strip the coating away from it.

The electric wire 63*a* pulled out of a bobbin 90 in which it is housed is delivered to the front end of stripping blades 93 by means of delivery rollers 91 as shown in FIG. 8(A) and the blades 93 are fed into the coating, which is then stripped away by reversing the delivery rollers 91.

Next, an electric wire 63*a* is delivered by a prescribed length, inserted between delivery rollers 92 and cut by means of the stripping blades 93 as illustrated in FIG. 8(B). After cutting, the stripping blades 93 are opened to return a cut electric wire 63*b* by the stripping length by means of delivery rollers 92 as illustrated in FIG. 8(C). The stripping blades 93 are fed again into the coating, which is then stripped away by reversing the delivery rollers 92.

This invention is suitable especially for an automatic wire stripper of high speed rotation type. Although a scratch on the core of electric wire 63*a* according to FIG. 8 is detectable also with heretofore known core scratch detection systems, it is difficult for such systems to detect any scratch on the core of electric wire 63*b* which has been cut short. The said function of detecting core scratch according to this invention is valid also for such case.

As the stripping blades come in contact with the wire core with a high probability in wire stripping processes, error signal is released every time when the stripping blades and the wire core have come in contact with each other to result in a frequent stoppage of automatic strippers provided with the heretofore known systems of core scratch detection. On the contrary, this invention enables to determine a wire product also as non-rejectable even if the stripping blades have come in contact with its core according to the extent or portion of contact by above-mentioned employment of the function to manage temporal elements of contact incl. duration, position etc. of contact so that unnecessary operation discontinuations can be prevented.

While some embodiments of the invention have been described in the above, the working form of the invention is not limited to the said embodiments, but is variable in many ways.

For example, other pulse signals with a certain frequency or other electric signals including AC signals such as sine wave signals, etc. can be available in place of the said rectangular wave signal. Besides, electric signals may be generated not only by means of a single power source, but also by use of multiple power sources.

This invention provides wire strippers capable of improving the function to detect any contact between the wire core and the stripping blades when automatically stripping the coating of electric wires at the end portion prescribed lengths and thus improving the quality of finished electric wires.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A wire stripper for feeding stripping blades into a coating of an electric wire and stripping a portion of the coating from a wire core of the electric wire by moving the stripping blades relative to the electric wire, comprising:
    a signal generator circuit connected to the stripping blades for generating an electric signal to the stripping blades; and
    a signal analyzer circuit connected to the stripping blades for detecting an impedance value through the stripping blades wherein any contact of the stripping blades with the wire core is detected by the signal analyzer circuit as a change in the impedance value caused by addition of an impedance of the wire core to the impedance value of the stripping blades at a moment of contact of the stripping blades with the wire core during a stripping operation removing the coating portion, the signal analyzer circuit generating an error signal to an error indicator in response to the detection of the change in impedance value.

2. The wire stripper according to claim 1 wherein the signal generator circuit generates the electric signal as a rectangular wave.

3. The wire stripper according to claim 1 including a current limiting circuit connected between the signal generator circuit and the stripping blades.

4. The wire stripper according to claim 1 including a logic circuit connected between the signal analyzer circuit and the error indicator, the logic circuit being responsive to the change in impedance value from the signal analyzer circuit and a time value for generating the error signal to the error indicator.

5. The wire stripper according to claim 4 including a control circuit connected to the logic circuit and providing the time value, the time value representing at least one of duration of contact between the stripping blades and the wire core, duration of the stripping operation, a selectable portion of the duration of the stripping operation and a selectable point in time during the stripping operation.

6. The wire stripper according to claim 5 wherein the control circuit enables a user to set conditions of determination under which the electric wire is deemed as non-rejectable depending on the contact duration or a point of contact of the stripping blades with the wire core.

7. The wire stripper according to claim 1 wherein the stripping blades operate as electrodes for detecting any contact between the stripping blades and the wire core, the stripping blades receiving the electric signal and outputting the impedance value.

8. The wire stripper according to claim 1 wherein the stripping blades are a pair of stripping blades positioned opposite to each other across the electric wire and oriented to allow the electric wire to move after the stripping blades have engaged the coating when a leading end of the electric wire strikes a front end of a sensor rod after passing between the stripping blades.

9. The wire stripper according to claim 1 wherein the stripper blades are actuated for cutting the electric wire at a prescribed position.

* * * * *